US009312529B2

(12) United States Patent
Bae (10) Patent No.: US 9,312,529 B2
(45) Date of Patent: Apr. 12, 2016

(54) SECONDARY BATTERY AND SECONDARY BATTERY ASSEMBLY (71) Applicant: Samsung SDI Co., Ltd., Yongin-si, Gyeonggi-do (KR)

(72) Inventor: Kwang-Soo Bae, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 333 days.

(21) Appl. No.: 13/838,928

(22) Filed: Mar. 15, 2013

(65) Prior Publication Data

US 2014/0154560 A1    Jun. 5, 2014

(30) Foreign Application Priority Data

Dec. 5, 2012    (KR) .................. 10-2012-0140271

(51) Int. Cl.
*H01M 2/20*    (2006.01)
*H01M 2/22*    (2006.01)
*H01M 2/26*    (2006.01)
*H01M 2/30*    (2006.01)
*H01M 2/10*    (2006.01)

(52) U.S. Cl.
CPC ............ *H01M 2/204* (2013.01); *H01M 2/1061* (2013.01); *H01M 2/30* (2013.01); *H01M 2220/30* (2013.01)

(58) Field of Classification Search
CPC ...... H01M 2/1061; H01M 2/204; H01M 2/30
USPC .................................................. 429/160, 179
See application file for complete search history.

(56) References Cited

U.S. PATENT DOCUMENTS

| 3,625,774 A * | 12/1971 | Rodgers ................. 429/121 |
| 2008/0085446 A1 | 4/2008 | Schmidt et al. |
| 2010/0173189 A1 | 7/2010 | Suzuki |
| 2012/0177978 A1 * | 7/2012 | Kim et al. ............. 429/159 |

FOREIGN PATENT DOCUMENTS

| JP | 2011-233491 A | 11/2011 |
| KR | 10-2007-0119605 A | 12/2007 |

* cited by examiner

*Primary Examiner* — Sean P Cullen
(74) *Attorney, Agent, or Firm* — Robert E. Bushnell, Esq.

(57) ABSTRACT

A secondary battery and a secondary battery assembly are provided. The secondary battery includes a bare cell, a housing, an opening and a terminal portion. The housing surrounds the bare cell. The opening is formed any one side of the housing, and includes a first opening, a second opening and a third opening formed adjacent to any one of the first and second openings. The terminal portion has at least one portion exposed to the outside of the housing through the opening so as to electrically connect between an external device and the bare cell. Accordingly, the two secondary batteries can be used by being easily connected to each other.

15 Claims, 9 Drawing Sheets

FIG. 12

SECONDARY BATTERY AND SECONDARY BATTERY ASSEMBLY

CLAIM PRIORITY

This application makes reference to, incorporates the same herein, and claims all benefits accruing under 35 U.S.C. §119 from an application earlier filed in the Korean Intellectual Property Office on 5 Dec. 2012 and there duly assigned Serial No. 10-2012-0140271.

BACKGROUND OF THE INVENTION

1. Field of the Invention

An aspect of the present invention relates to a secondary battery and secondary battery assembly.

2. Description of the Related Art

Secondary batteries have been variously used as power sources of portable electronic devices. As the portable electronic devices are used in various fields, demands on secondary batteries are rapidly increased. Such a secondary battery can be charged/discharged a plurality of times, and thus is economically and environmentally efficient. Accordingly, the use of the secondary battery is encouraged.

The above information disclosed in this Related Art section is only for enhancement of understanding of the background of the invention and therefore it may contain information that does not form the prior art that is already known to a person of ordinary skill in the art.

SUMMARY OF INVENTION

Aspects provide a secondary battery and a secondary battery assembly, which can facilitate the connection of secondary batteries by employing a new structure.

According to an aspect of the present invention, there is provided a secondary battery, including: a bare cell; a housing surrounding the bare cell; an opening formed any one side of the housing, and including a first opening, a second opening and a third opening formed adjacent to any one of the first and second openings; and a terminal portion having at least one portion exposed to the outside of the housing through the opening so as to electrically connect between an external device and the bare cell.

The third opening may be positioned adjacent to the first opening.

The terminal portion may include a first terminal portion exposed to the outside through the first and third openings, and integrally formed with the first and third openings; and a second terminal portion exposed to the outside through the second opening.

A long side of long and short sides of the third opening may be formed to make an angle with a long side of long and short sides of the first opening.

The first and third openings may be formed perpendicular to each other.

The first and third openings may be placed to form a cross shape, T-shape or L-shape.

The first and second openings may be positioned in parallel to each other.

The distance between the first and second openings may be two times greater than that from the third opening to an outer surface of the housing, which is most adjacent to the third opening.

The opening may further include a fourth opening formed adjacent to the second opening of the first and second openings.

The terminal portion may include a main body portion positioned inside the housing, and a leg portion extended from the main body portion so as to be exposed to the outside through the opening.

The leg portion of the terminal portion exposed to the outside through the first opening may be integrally connected to the leg portion of the terminal portion exposed to the outside through the third opening.

The terminal portion may further include a connection portion electrically connecting the main body portion and the bare cell to each other.

The leg portion may have a holding groove formed therein.

The leg portion may have a pair of extending portions bent to have elasticity.

According to an aspect of the present invention, there is provided a secondary battery assembly, including: two secondary batteries each including a bare cell, a housing surrounding the bare cell, an opening formed any one side of the housing and including a first opening, a second opening and a third opening formed adjacent to any one of the first and second openings, and a terminal portion having at least one portion exposed to the outside of the housing through the opening so as to electrically connect between an external device and the bare cell; and a connection pin electrically connecting between the two secondary batteries by connecting between the terminal portions.

The two secondary batteries may be displaced so that the openings are adjacent to each other.

The distance between the first and second openings may be two times greater than that from the third opening to an outer surface of the housing, which is most adjacent to the third opening.

The third opening of any one of the two secondary batteries may be formed adjacent to the first opening, and the third opening of the other of the two secondary batteries may be formed adjacent to the second opening.

The connection pin may electrically connect the terminal portion positioned in the second opening of any one of the two secondary batteries to the terminal portion positioned in the first opening of the other of the two secondary batteries.

Other features and advantages of the present invention will become more fully apparent from the following detailed description, taken in conjunction with the accompanying drawings.

Terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

According to the secondary battery and the secondary battery assembly of the present invention, a third opening is further included in addition to first and second openings, so that two secondary batteries can be easily used by being connected to each other.

Further, since the two secondary batteries can be connected to each other by considering the shape of terminals of an external device, it is unnecessary to prepare a separate secondary battery having high voltage, and accordingly, the present invention can be efficient and economical.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

The example embodiments are described more fully hereinafter with reference to the accompanying drawings. The inventive concept may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like or similar reference numerals refer to like or similar elements throughout. As used herein, the term "and/or" includes any and all combinations of one or more of the associated listed items.

It will be understood that, although the terms first, second, third etc. may be used herein to describe various elements, components, regions, layers, patterns and/or sections, these elements, components, regions, layers, patterns and/or sections should not be limited by these terms. These terms are only used to distinguish one element, component, region, layer pattern or section from another region, layer, pattern or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross sectional illustrations that are schematic illustrations of illustratively idealized example embodiments (and intermediate structures) of the inventive concept. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Secondary Battery

As a decrease in the size and weight of the electronic devices is required, a decrease in the size and weight of the secondary battery is also required. However, since a material as lithium having high reactivity is provided inside the secondary battery, there is a limitation in decreasing the size and weight of the secondary battery due to safety. Accordingly, a variety of studies have been conducted to develop a secondary battery which can decrease its size and weight while improving the safety of the secondary battery.

Meanwhile, in order to increase voltage in the use of the secondary battery, two secondary batteries are connected in series to each other. However, secondary batteries commercialized as commercial products have a constant voltage and a connection structure formed in one direction. Therefore, it is difficult to use the secondary batteries in external devices that require higher voltage.

Figure 1:
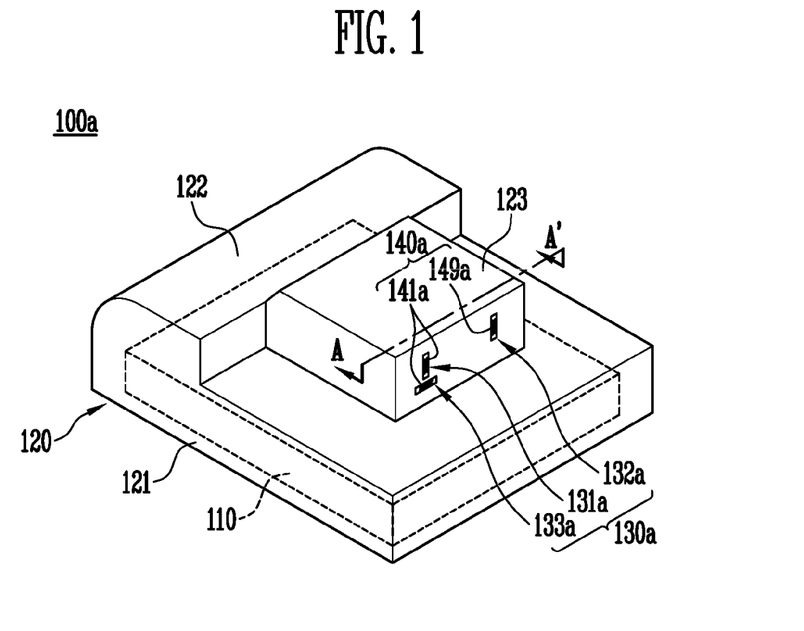
FIG. 1 is a perspective view of a secondary battery according to an embodiment of the present invention.
Figure 2:
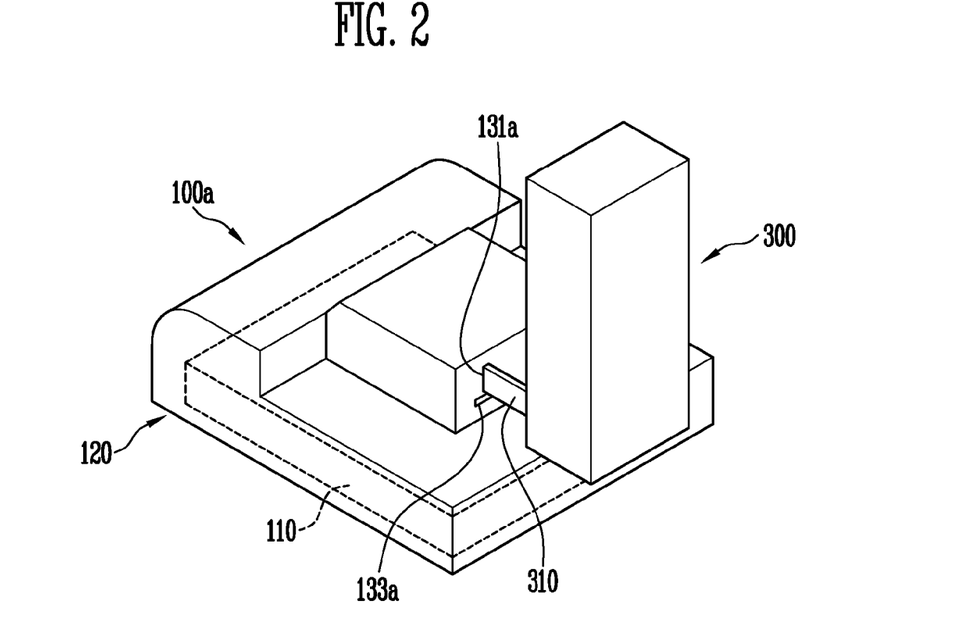
FIG. 2 is a perspective view showing a state in which an external device is mounted to the secondary battery shown in FIG. 1.

FIG. 1 is a perspective view of a secondary battery 100a according to an embodiment of the present invention. FIG. 2 is a perspective view showing a state in which an external device 300 is mounted to the secondary battery 100a shown in FIG. 1. Hereinafter, the secondary battery 100a according to this embodiment will be described in detail with reference with FIGS. 1 and 2.

As shown in FIGS. 1 and 2, the secondary battery 100a according to this embodiment may include a bare cell 110, a housing 120 surrounding the bare cell 110, an opening 130a formed at any one side of the housing 120, and a terminal portion 140a exposed to the outside of the housing 120 through the opening 130a.

The bare cell 110 is a member that generates electrochemical energy through the movement of ions or electrons.

The bare cell 110 may be manufactured by accommodating an electrode assembly and an electrolyte in a battery case. Here, the electrode assembly is formed by winding or stacking a positive electrode plate, a negative electrode plate and a separator interposed between these electrode plates. The electrode assembly generates energy by an electrochemical reaction between the electrode assembly and the electrolyte, and the generated energy is supplied to the outside of the bare cell 110 through electrode tabs, etc.

Meanwhile, the bare cell 110 according to this embodiment may be configured in plural numbers, and the plurality of bare cells may be arranged into, for example, a 5S1P structure in the housing 120.

The housing 120 may be a member that surrounds the bare cell 110. The housing 120 may protect the bare cell 110 and the terminal portion 140a by insulating the bare cell 110 and the terminal portion 140a from the outside.

Here, the housing 120 may include a first region 121, a second region 122 and a third region 123. The first region 121 may be a region in which the bare cell 110 is positioned, and may be greater than the second and third regions 122 and 123. The second region 122 may protrude from one side of the first region 121, and may include, for example, a latch, etc. In this case, the latch included in the second region 122 may be used to couple the external device (see FIG. 2) and the secondary battery 100a to each other or to couple two secondary batteries 100a to each other. The third region 123 may protrude from the other side of the first region 121, and may be positioned on the same plane as the second region 122. The third region 123 may have the opening 130a formed in one surface thereof. The terminal portion 140a, a circuit board and the like may be positioned in the third region 123.

Meanwhile, the housing 120 may be formed of, for example, resin so that an undesired short circuit between the bare cell 110 and the terminal portion 140a does not occur.

Figure 3:
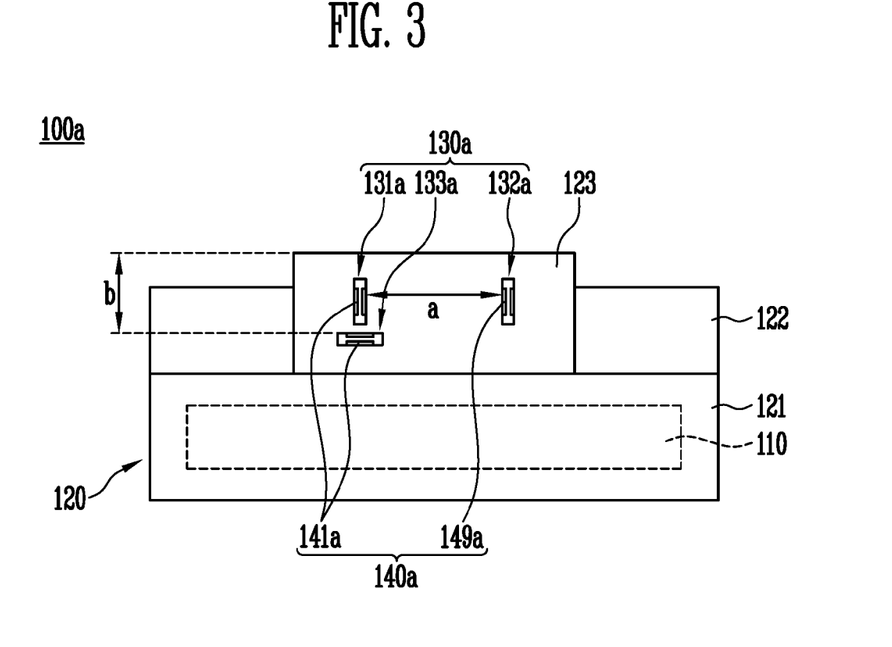
FIG. 3 is a plan view of the secondary battery shown in FIG. 1.

FIG. 3 is a plan view of the secondary battery 100a shown in FIG. 1. Hereinafter, the opening 130a and the terminal portion 140a, formed in the housing 120 of the secondary battery 100a according to this embodiment, will be described in detail with reference to FIG. 3.

The opening 130a may be formed at any one side of the housing 120, e.g., the third region 123 of the housing 120. The opening 130a may include a first opening 131a, a second opening 132a, and a third opening 133a formed adjacent to any one of the first and second openings 131a and 132a. In this embodiment, the third opening 133a may be formed adjacent to the first opening 131a. However, the third opening 133a may be formed adjacent to the second opening 132a.

The first and second openings 131a and 132a may be positioned in parallel with each other. For example, the first and second openings 131a and 132a may be formed to be inclined, more specifically, perpendicular to an adjacent outer surface of the housing 120. The third opening 133a may be positioned adjacent to the first opening 131a, and may be positioned to form an angle with the first opening 131a. Here, that the third opening 133a may be positioned to form an angle with the first opening 131a may means that each of the first and third openings 131a and 133a has a slit shape having long and short sides, and the long sides of the first and third openings 131a and 133a are inclined to each other. For example, as shown in FIG. 2, the third opening 133a may be positioned perpendicular to the first opening 131a, thereby forming a "T" shape. In this case, the first and third openings 131a and 133a may be positioned to overlap with each other, or may be positioned to be spaced apart from each other as shown in FIG. 2. Although it has been illustrated in FIGS. 1 and 2 that the third opening 133a may be positioned more adjacent to the inside of the housing 120, i.e., the first region 121 than the first opening 131a, the third opening 133a may be positioned more outward from the housing 120 than the first opening 131a.

Meanwhile, the distance a between the first and second openings 131a and 132a may be two times greater than that b from the third opening 133a to the outer surface of the housing, which may be most adjacent to the third opening 133a. This is for the purpose that when the two secondary batteries 100a are connected to each other, the distance between two third openings 133a and 133e (see FIG. 9) is identical to that between the first and second openings 131a and 132a.

The terminal portion 140a may be exposed to the outside through the opening portion 130a so as to electrically connect between the external device 300 (see FIG. 2) and the bare cell 110.

The terminal portion 140a may include a first terminal portion 141a exposed to the outside through the first and third openings 131a and 133a, and a second terminal portion 149a exposed to the outside through the second opening 132a. The terminal portion 140a includes not only a case where the terminal portion 140a directly contact the bare cell 110 as shown in FIG. 3, but also a case where the terminal portion 140a may be electrically connected to the bare cell 110 through another conductive member, e.g., a circuit board or the like, which may be positioned in the housing 120. Terminals 310 of the external device 300 and the bare cell 110 are electrically connected to each other through the terminal portion 140a, and accordingly, electrical energy of the bare cell 110 can be provided to the external device 300.

Meanwhile, any one of the first and second terminal portions 141a and 149a may be connected to a positive electrode terminal of the bare cell 110, and the other of the first and second terminal portions 141a and 149a may be connected to a negative electrode terminal of the bare cell 110.

Figure 4:
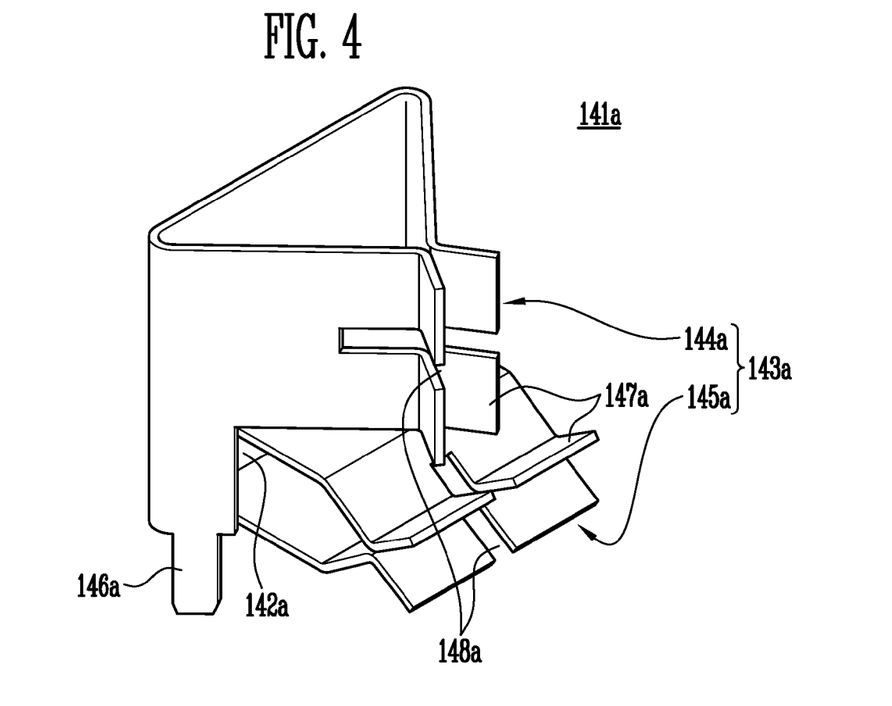
FIG. 4 is a perspective view of a first terminal portion in a terminal portion shown in FIG. 1.
Figure 5:
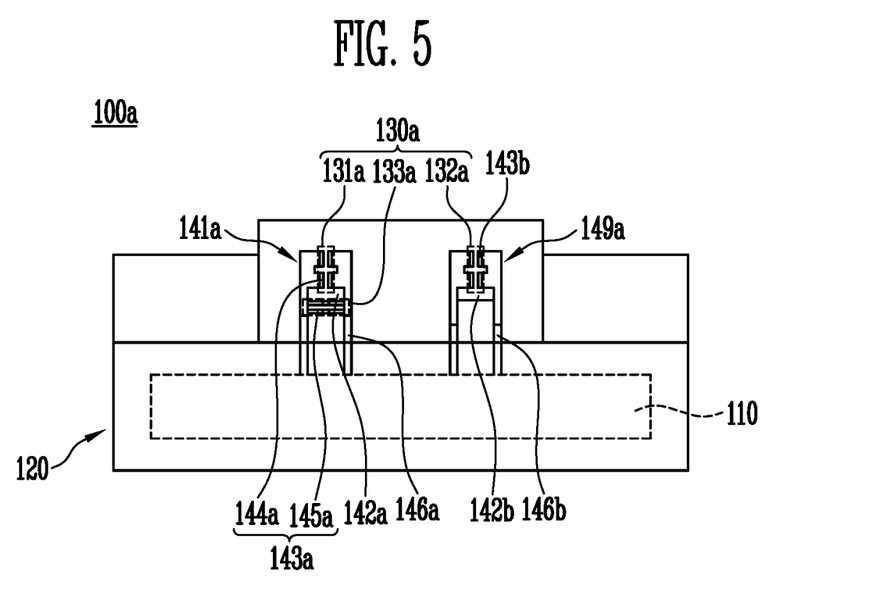
FIG. 5 is a sectional view of the secondary battery taken along line A-A' of FIG. 1.

FIG. 4 is a perspective view of the first terminal portion 141a in the terminal portion 140a shown in FIG. 1. FIG. 5 is a sectional view of the secondary battery 100a taken along line A-A' of FIG. 1. Hereinafter, the first terminal portion 141a of the secondary battery 100a according to this embodiment will be described in detail with reference to FIGS. 4 and 5.

As shown in FIGS. 4 and 5, the first terminal portion 141a may include a first main body portion 142a, a leg portion 143a extended from the first main body portion 142a, and a first connection portion 146a extended from the first main body portion 142a so as to electrically connect the first terminal portion 141a and the bare cell 110 to each other. Here, the leg portion 143a may be integrally extended from the first main body portion 142a, so as to be exposed through the first and third openings 131a and 133a. Specifically, the leg portion 143a may include a first leg portion 144a extended from the first main body portion 142a so as to be exposed through the first opening 131a, and a third leg portion 145a extended from the first main body portion 142a so as to be exposed through the third opening 133a. In this case, the first and third leg portions 144a and 145a may be integrally formed. Each of the first and third leg portions 144a and 145a may have a pair of extending portions 147a. The terminal 310 of the external device 200 (see FIG. 2) may be inserted between the pair of extending portions 147a so as to be held to the terminal portion 140a by elasticity of the extending portions 147a. Meanwhile, a holding groove 148a may be further formed in each extending portion 147a, and accordingly, it is possible to reduce energy consumed when the terminal 310 of the external device 300 may be inserted.

The first connection portion 146a may be directly connected to the bare cell 110, for example, through soldering, etc. Alternatively, the first connection portion 146a may be connected to the bare cell 100 through a circuit board, etc. The first connection portion 146a may be integrally connected to the first main body portion 142a.

Figure 6:
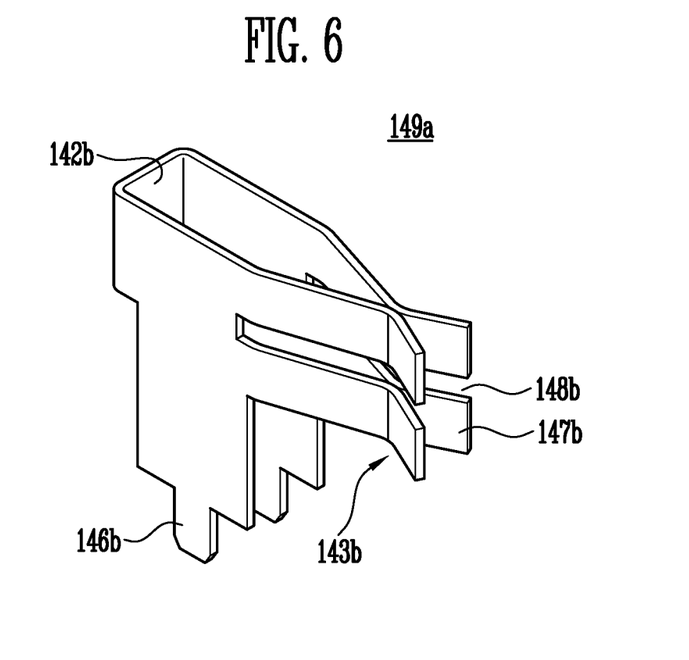
FIG. 6 is a perspective view of a second terminal portion in the terminal portion shown in FIG. 1.

FIG. 6 is a perspective view of a second terminal portion 149a in the terminal portion 140a shown in FIG. 1. Hereinafter, the second terminal portion 149a according to this embodiment will be described in detail with reference to FIGS. 5 and 6.

As shown in FIGS. 5 and 6, the second terminal portion 149a may include a second main body 142b, a second leg portion 143b extended from the second main body 142b and exposed to the outside through the second opening 132, and a second connection portion 146b electrically connecting the second main body portion 142b and the bare cell 110. In this case, the second leg portion 143b may include a pair of extending portions 147b bent to have elasticity, and the terminal 310 of the external device 300 may be inserted between the extending portions 147b so as to be held to the terminal portion 140a by elasticity of the extending portions 147b. A holding groove 148b may be further formed in the extending portion 147b of the second leg portion 143b.

Meanwhile, the second terminal portion 149a may be positioned so that at least one portion of the second terminal portion 149a may be exposed through the second opening 132a. Therefore, unlike the first terminal portion 141a, the second terminal portion 149a may include only the one second leg portion 143b having the pair of extending portions 147b.

Figure 7A:
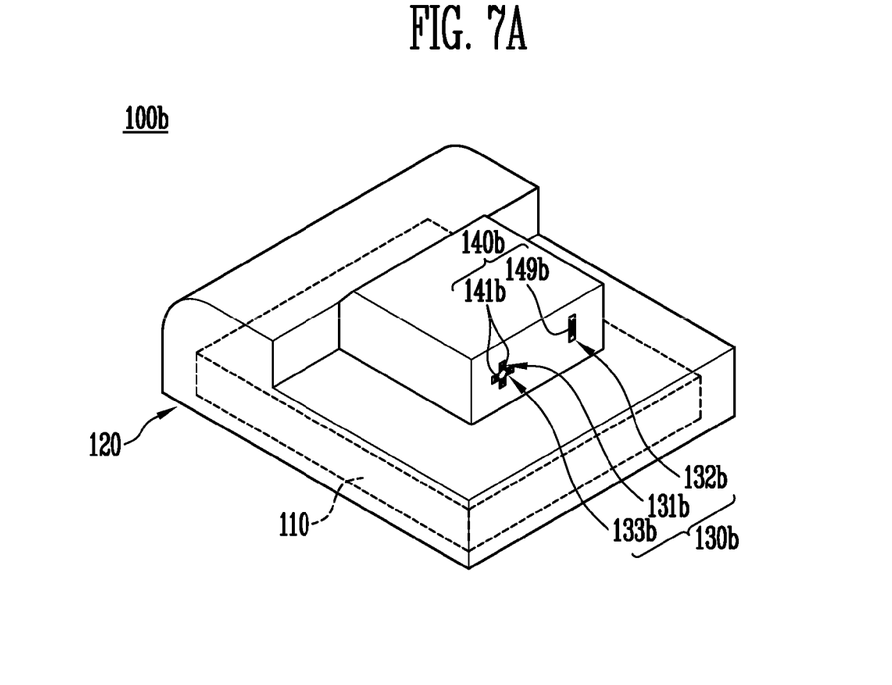
FIGS. 7A and 7B are perspective views of secondary batteries according to another embodiments of the present invention.
Figure 7B:
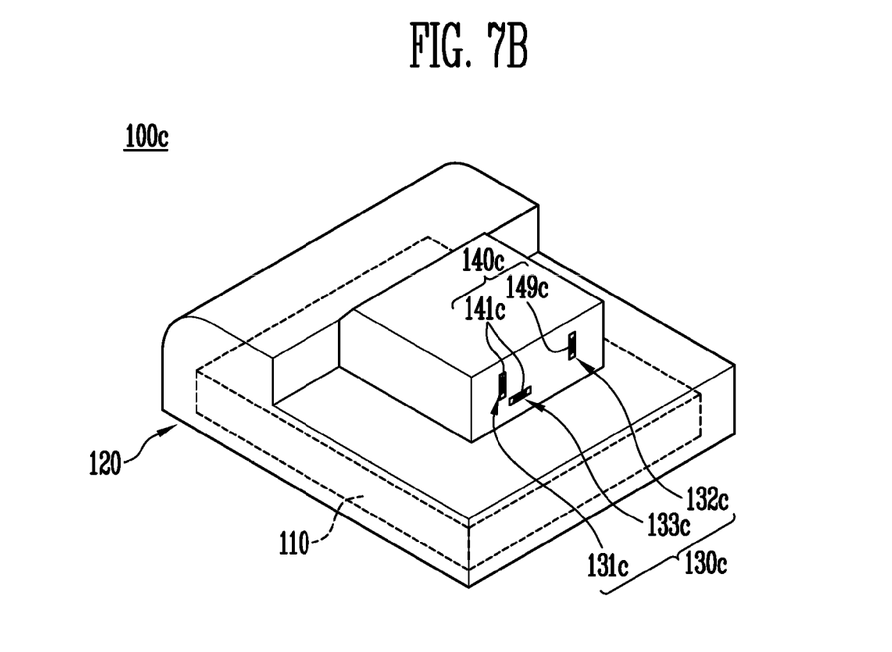

FIGS. 7A and 7B are perspective views of secondary batteries 100b and 100c according to another embodiments of the present invention. Hereinafter, the secondary batteries 100b and 100c according to these embodiments will be described in detail with reference to FIGS. 7A and 7B. Here, components identical and corresponding to those of the aforementioned embodiment are designated by like reference numerals, and their detailed descriptions will be omitted to avoid redundancy.

In the secondary batteries 100b and 100c according to these embodiments, the placement of openings 130b and 130c are different from that of the embodiment shown in FIG. 1. Here, third openings 133b and 133c are adjacent to first openings 131b and 131c, respectively. However, the present invention is not limited thereto, and the third openings 133b and 133c may be adjacent to second openings 132b and 132c, respectively.

As shown in FIG. 7A, the first and third openings 131b and 133b may form, for example, a cross shape so as to meet each other while crossing at right angles. Alternatively, as shown in FIG. 7B, the first and third opening 131c and 133c may be placed to form an "L" shape.

A terminal portion 140b may include a first terminal portion 141b and a terminal portion 140c may include a first terminal portion 141c and a second terminal portion 149c. Any one of the first and second terminal portions 141b and 149b may be connected to a positive electrode terminal if the bare cell 110, and the other of the first and second terminal portions 141b and 149b may be connected to a negative electrode terminal of the bare cell 110. In this case, the first terminal portion 141b or 141c having at least one portion exposed through the first opening 131b or 131e and the third opening 133b or 133c may be implemented by appropriately placing the first and third leg portions 144a and 145a to respectively correspond to the first opening 131b or 131c and the third opening 133b or 133c.

Figure 8:
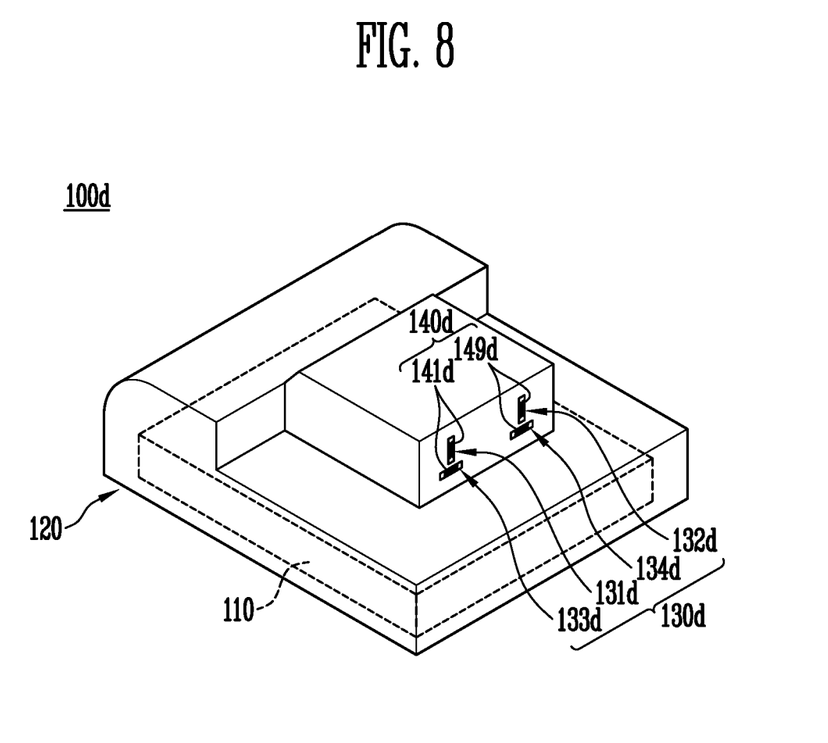
FIG. 8 is a perspective view of a secondary battery according to still another embodiment of the present invention.

FIG. 8 is a perspective view of a secondary battery 100d according to still another embodiment of the present invention. Hereinafter, the secondary battery 100d according to this embodiment will be described in detail with reference to FIG. 8. Here, components identical and corresponding to those of the aforementioned embodiments are designated by like reference numerals, and their detailed descriptions will be omitted to avoid redundancy.

As shown in FIG. 8, the secondary battery 100d according to this embodiment further includes a fourth opening 134d, and the fourth opening 134d may be formed at a position corresponding to a third opening 133d, e.g., a position adjacent to a second opening 132d. Thus, the placement of a first opening 131d and the third opening 133d can correspond to that of the second opening 132d and the fourth opening 134d. Accordingly, both first and second terminal portions 141d and 149d can have the same shape of the first terminal portion 141a shown in FIG. 4. Further, a terminal portion 140d is exposed to the outside of the housing 120 through the opening, 130d.

As described above, in a case where the secondary battery 100d further includes the fourth opening 134d, the fourth opening 134d can be used regardless of polarity, thereby providing convenience. In a case where the terminals 310 of the external device 300 has, for example, a shape such as "∥," the terminals 310 may be inserted into the first and second openings 131d and 132d, respectively. In a case where the terminals 310 of the external device 300 has, for example, a shape such as "--," the terminals 310 may be inserted into the third and fourth openings 133d and 134d, respectively. Thus, it is possible to more flexibly cope with the shape of the terminals 310.

Meanwhile, although it has been illustrated in this embodiment that the placement of the first and third openings 131d and 133d and the placement of the second and fourth openings 132d and 134d are similar to that of the first and third openings 131a and 133a, shown in FIG. 1, the present invention is not limited thereto. For example, the placement of the first and third openings 131d and 133d and the placement of the second and fourth openings 132d and 134d may be similar to that of the first opening 131b or 131c and the third opening 133b or 133c, shown in FIG. 7A or 7B.

Secondary Battery Assembly

Figure 9:
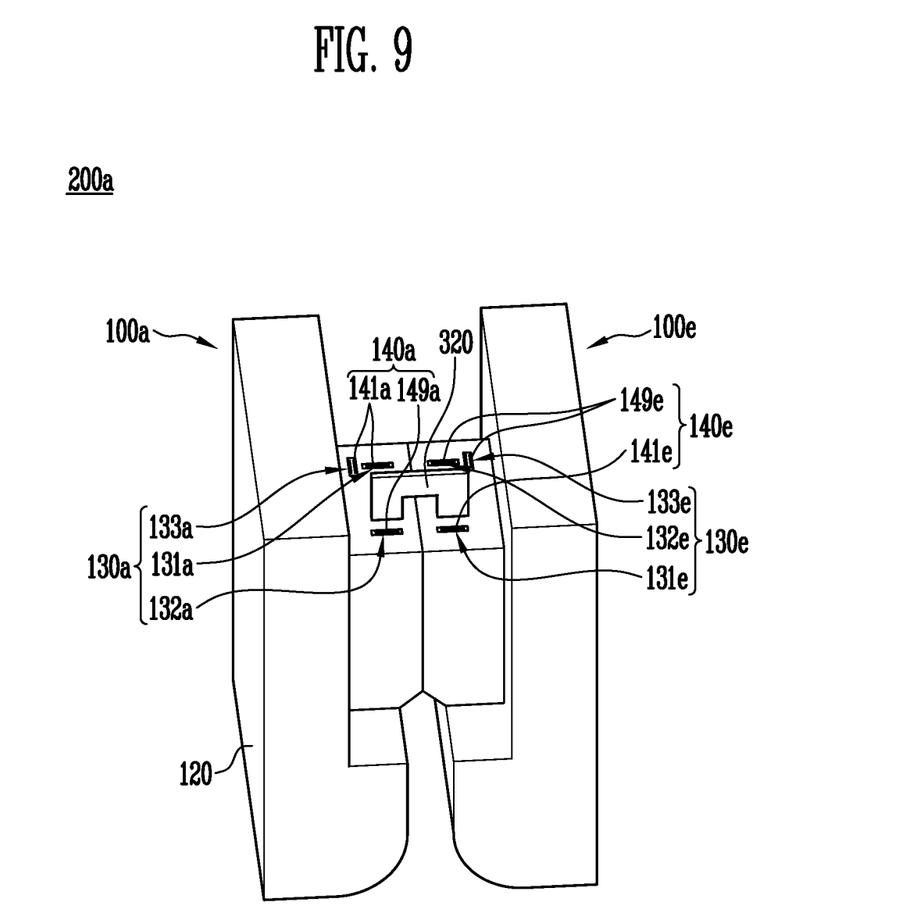
FIG. 9 is a perspective view of a secondary battery assembly according to an embodiment of the present invention.
Figure 10:
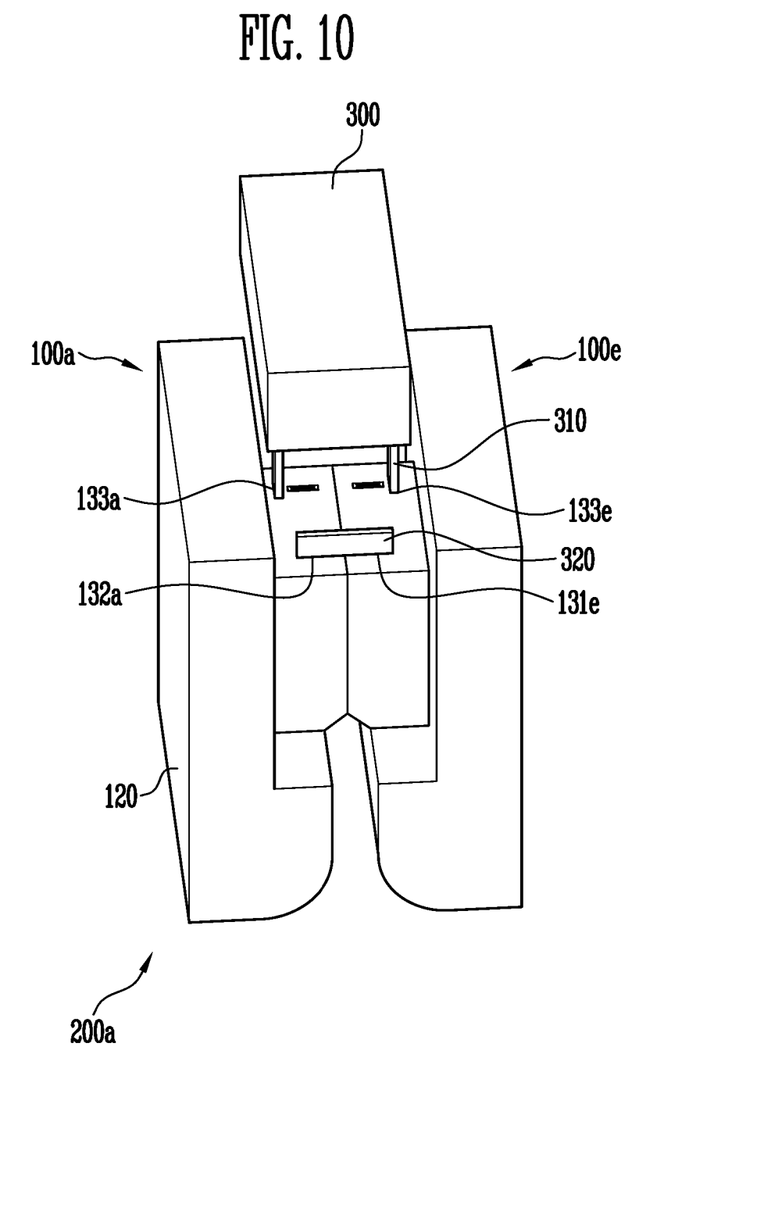
FIG. 10 is a perspective view showing a state in which an external device is connected to the secondary battery assembly shown in FIG. 9.

FIG. 9 is a perspective view of a secondary battery assembly 200a according to an embodiment of the present invention. FIG. 10 is a perspective view showing a state in which an external device 300 may be connected to the secondary battery assembly 200a shown in FIG. 9. Hereinafter, the secondary battery assembly 200a according to this embodiment will be described in detail with reference to FIGS. 9 and 10. For convenience of illustration, a state in which a connection pin 320 may be separated from openings 130a and 130e is shown in FIG. 9.

As shown in FIGS. 9 and 10, the secondary battery assembly 200a according to this embodiment may include two secondary batteries 100a and 100e, and a connection pin 320 electrically connecting between the two secondary batteries 100a and 100e.

The two secondary batteries 100a and 100e may be configured to include a first secondary battery 100a and a second secondary battery 100e.

Here, the first secondary battery 100a may be the secondary battery 100a shown in FIG. 1. For example, a third opening may be formed adjacent to a first opening 131a, and a terminal portion 140a may include a first terminal portion 141a may be exposed to the outside through the first and third opening 131a and 133a, and a second terminal portion 149a exposed to the outside through a second opening 132a. In this case, the first terminal portion 141a of the first secondary battery 100a may include two leg portions 143a exposed to the outside through the first and third openings 131a and 133a (see FIG. 4), and the second terminal 149a of the first secondary hatter 100a may include one second leg portion 143b exposed to the outside through the second opening 132a (see FIG. 6).

The second secondary battery 100e may have a configuration opposite to that of the secondary battery 100a shown in FIG. 1. For example, a third opening 133e may be formed adjacent to a second opening 132e, and a terminal portion 140e may include a first terminal portion 141e exposed to the outside through a first opening 131e, and a second terminal portion 149e exposed to the outside through the second and third openings 132e and 133e. In this case, the first terminal portion 141e of the second secondary battery 100e may include any one leg portion exposed to the outside through the first opening 131e (see FIG. 6), and the second terminal portion 149e of the second secondary battery 100e may include two leg portions exposed to the outside through the second and third openings 132e and 133e (see FIG. 4).

Meanwhile, the first and second secondary batteries 100a and 100e may be coupled to each other through the structure of a latch positioned in a second region 122 of each housing 120. The first and second secondary batteries 100a and 100e may be placed so that the openings 130a and 130e respectively positioned in third regions 123 of the housings 120 are adjacent to each other.

The connection pin 320 connects between the terminal portions 140a and 140e of the first and second secondary batteries 100a and 100e, so that the first and second secondary batteries 100a and 100e can be electrically connected to each other.

Here, connection pin 320 may be inserted into any one of the first opening 131a or 131e and the second opening 132a or 132e, to which the third opening 133a or 133e is not positioned adjacent. In this embodiment: the connection pin 320 may be inserted into, for example, the second opening 132a of the first secondary battery 100a and the first opening 131e of the second secondary battery 100e. Thus, the connection pin 320 can connect the second terrain, portion 149a positioned in the second opening 132a of the first secondary battery 100a and the first terminal portion 141e positioned in the first opening 131e of the second secondary battery 100e. Accordingly, the first and second secondary batteries 100a and 100e can be electrically connected to each other.

Meanwhile, although it has been described in this embodiment that the first secondary battery 100a has the same configuration as the secondary battery 100a shown in FIG. 1 and the second secondary battery 100e has the opposite configuration to the secondary battery 100a shown in FIG. 1, the present invention is not limited thereto. For example, both the first and second secondary batteries 100a and 100e may have the same configuration as the secondary battery 100d shown in FIG. 8. In this case, the secondary batteries can be placed regardless of their polarities, the secondary battery assembly can be further efficient.

In this embodiment, the first secondary battery 100a may have the configuration shown in FIGS. 7A and 7B. In this case, the first secondary battery 100a may have the opposite configuration to the second secondary battery 100e.

Figure 11:
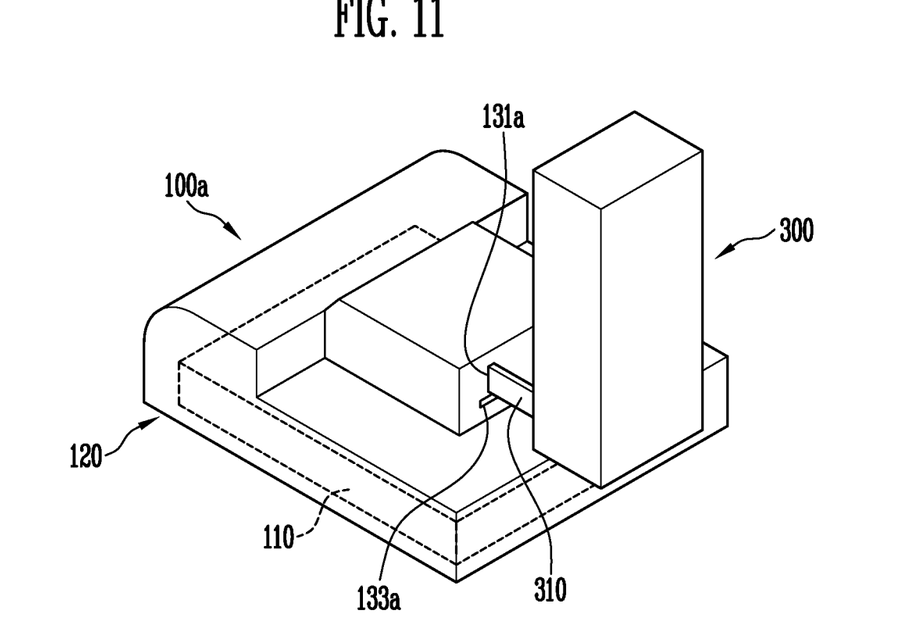
FIGS. 11 and 12 are perspective views illustrating operations of the secondary battery and the secondary battery assembly according to the embodiments of the present invention.
Figure 12:
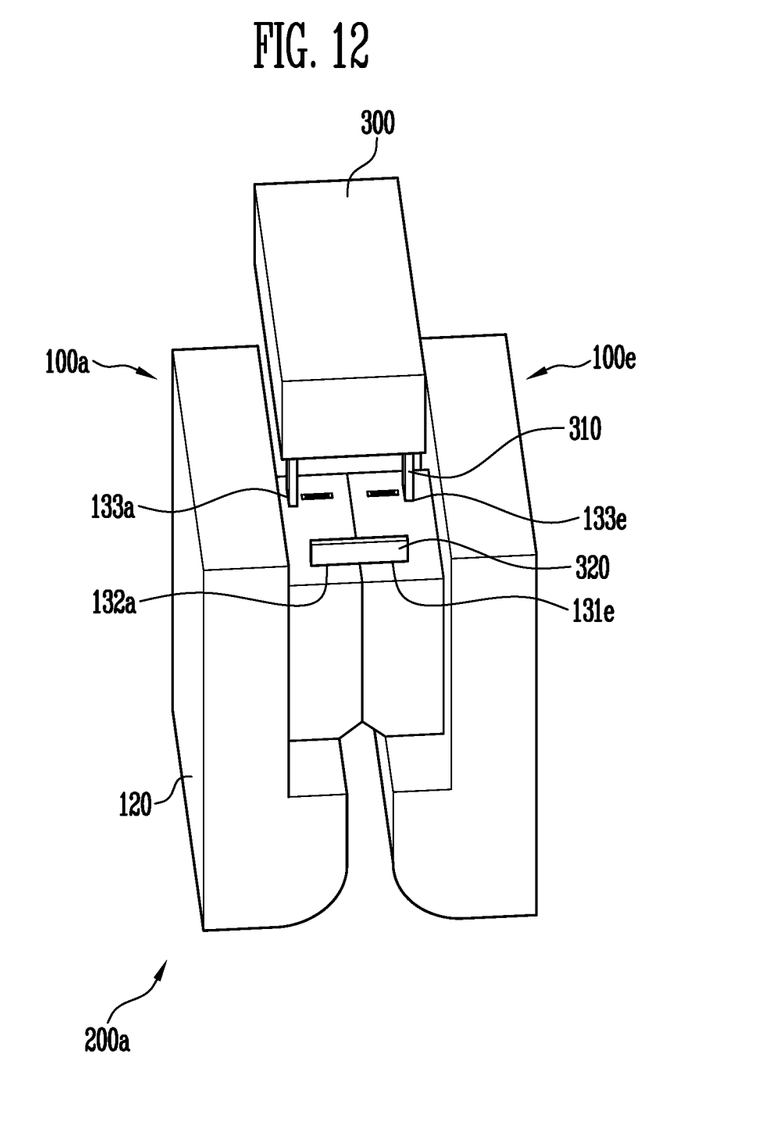

FIGS. 11 and 12 are perspective views illustrating operations of the secondary battery 100a and the secondary battery assembly 200a according to the embodiments of the present invention. Hereinafter, the operations of the secondary battery 100a and the secondary battery assembly 200a will be described in detail with reference to FIGS. 11 and 12.

For example, in a case where an external device such as an electric power tool may be used by being connected to the secondary battery, higher voltage may be required according to the external device. In this case, the voltage of one secondary battery may be constant, for example, as 4.2V, and therefore, the secondary battery cannot be used for an external device requiring 8.4V. Accordingly, a plan for using two secondary battery connected in series to each other is necessarily considered. However, the terminal of the external device may be generally formed in the shape of a rectangle having any one side longer than another side (see the terminal 310 of the external device 300 shown in FIGS. 2 and 10), and therefore, directionality exists in the terminal of the external device. Accordingly, in a case where the two secondary batteries are connected in series to each other, it is difficult to insert the terminal of the external device into the opening due to the directionality of the terminal of the external device.

However, in the secondary battery 100a and the secondary battery assembly 200a according to the exemplary embodiments of the present invention, the third opening 133a may be formed adjacent to any one of the first and second openings 131a and 132a (see FIG. 1), and thus it is possible to overcome the difficulty described above.

For example, when the external device 300 requiring 4.2V is used, the one secondary battery 100a may be used as shown in FIG. 11. In a case where the terminals 310 of the external device 300 has a shape such as '||,' the terminal portion 140a and the terminals 310 are electrically connected to each other by respectively inserting the terminals 310 of the external device 300 into the first and second openings 131a and 132a of the secondary battery 100a, so that the external device 300 can be used.

For example, when the external device requiring 8.4V is used, the two secondary batteries 100a and 100e may be used by being connected in series to each other as shown in FIG. 12. In this case, the terminals 310 of the external device 300 are inserted into the third openings 133a and 133e of the first and second secondary batteries 100a and 100e so as to be electrically connected to the terminal portions 140a and 140e (see FIG. 9), respectively. The connection pin 320 may be inserted into the second opening 132a of the first secondary battery 100a and the first opening 131e of the second secondary battery 100e, so that the two secondary batteries 100a and 100e can be connected in series to each other. Thus, it is unnecessary to boost the voltage of a secondary battery or to provide a separate secondary battery having high voltage, and accordingly, the secondary battery 100a and the secondary battery assembly 200a can be efficient and economical.

In order to derive the serial connection between the secondary batteries 100a and 100e having the constant voltage described above, the distance a between the first opening 131a or 131e and the second opening 132a or 132e is preferably two times greater than that b from the third opening 133a or 133e to the outer surface of the housing 120, adjacent to the third opening 133a or 133e (see FIG. 3). When considering the distance between the terminals 310 of the external device 300, the distance between the terminals 310 of the external device 300 may also be two times greater than that from the third opening 133a or 133e to the outer surface of the housing 120, adjacent to the third opening 133a or 133e.

Meanwhile, although it has been described in this embodiment that the two secondary batteries 100a and 100e are connected in series to each other, the two secondary batteries 100a and 100e may be connected in parallel to each other.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery, comprising:
   a bare cell;
   a housing surrounding the bare cell;
   an opening formed on any one side of the housing, said opening including a first opening, a second opening and a third opening, said third opening is formed adjacent to any one of the first and second openings; and
   a terminal portion having at least one portion exposed to the outside of the housing through at least one of the first, second and third openings so as to electrically connect between an external device and the bare cell;
   wherein said first opening has no direct physical contact with the second and third openings,
   wherein said second opening has no direct physical contact with the first and third openings,
   wherein said third opening has no direct physical contact with the first and second openings,
   wherein the distance between the first and second openings is two times greater than from the third opening to an outer surface of the housing, which is most adjacent to the third opening, and
   wherein the terminal portion includes:
   a first terminal portion exposed to the outside through the first and third openings, and integrally formed with the first and third openings; and
   a second terminal portion exposed to the outside through the second opening.

2. The secondary battery of claim 1, wherein the first and second openings are positioned in parallel to each other.

3. The secondary battery of claim 1, wherein the third opening is positioned adjacent to the first opening.

4. The secondary battery of claim 3, wherein the first and third openings have a rectangular shape with four sides in which two of the four sides are longer than the remaining two sides, and the first and second openings positioned parallel to each other.

5. The secondary battery of claim 3, wherein the first and third openings are formed perpendicular to each other.

6. The secondary battery of claim 3, wherein the opening further includes a fourth opening formed adjacent to the second opening of the first and second openings.

7. A secondary battery, comprising:
   a bare cell;
   a housing surrounding the bare cell;
   an opening formed on any one side of the housing, said opening including a first opening, a second opening and a third opening, said third opening is formed adjacent to any one of the first and second openings; and
   a terminal portion having at least one portion exposed to the outside of the housing through at least one of the first, second and third openings so as to electrically connect between an external device and the bare cell,
   wherein said first opening has no direct physical contact with the second and third openings,
   wherein said second opening has no direct physical contact with the first and third openings,
   wherein said third opening has no direct physical contact with the first and second openings, and
   wherein the distance between the first and second openings is two times greater than from the third opening to an outer surface of the housing, which is most adjacent to the third opening,
   wherein the terminal portion includes a main body portion positioned inside the housing, and a leg portion extended from the main body portion so as to be exposed to the outside through at least one of the first, second, and third openings, and
   wherein the leg portion of the terminal portion is exposed to the outside through the first opening is integrally connected to another leg portion of the terminal portion exposed to the outside through the third opening.

8. The secondary battery of claim 7, wherein the terminal portion further includes a connection portion electrically connecting the main body portion and the bare cell to each other.

9. The secondary battery of claim 7, wherein the leg portion has a holding groove formed therein.

10. The secondary battery of claim 7, wherein the leg portion has a pair of extending portions bent to have elasticity.

11. A secondary battery assembly, comprising:
    two secondary batteries, each secondary battery comprising:
    a bare cell;
    a housing surrounding the bare cell;
    an opening formed on any one side of the housing, the opening having a first opening, a second opening and a third opening, said third opening formed adjacent to any one of the first and second openings; and
    a terminal portion exposed to the outside of the housing through the first and third openings and integrally formed with the first and third openings so as to electrically connect between an external device and the bare cell,
    wherein a connection pin that electrically connects the two secondary batteries by connecting between the terminal portion of each secondary battery,
    wherein said first opening has no direct physical contact with the second and third openings of each secondary battery,
    wherein said second opening has no direct physical contact with the first and third openings of each secondary battery,
    wherein said third opening has no direct physical contact with the first and second openings of each secondary battery, and
    wherein the distance between the first and second openings in each secondary battery is two times greater than from the third opening in each secondary battery to an outer surface of the housing, which is most adjacent to the third opening in each secondary battery.

12. The secondary battery assembly of claim 11, wherein the two secondary batteries are positioned so that the first, second, and third openings of each secondary battery are adjacent to each other.

13. The secondary battery assembly of claim 11, wherein the first, second and third openings each have a rectangular shape and the first and third openings are placed relative to each other to form a spatial representation of a T-shape or L-shape.

14. The secondary battery assembly of claim 11, wherein the third opening of any one of the two secondary batteries is formed adjacent to the first opening, and the third opening of the other of the two secondary batteries is formed adjacent to the second opening.

15. The secondary battery assembly of claim 14, wherein the connection pin electrically connects the terminal portion positioned in the second opening of any one of the two secondary batteries to the terminal portion positioned in the first opening of the other of the two secondary batteries.

* * * * *